United States Patent
Ihata et al.

(10) Patent No.: US 6,870,288 B2
(45) Date of Patent: Mar. 22, 2005

(54) ROTARY ELECTRIC MACHINE

(75) Inventors: Kouichi Ihata, Okazaki (JP); Motoki Ito, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/737,858

(22) Filed: Dec. 18, 2003

(65) Prior Publication Data

US 2004/0124723 A1 Jul. 1, 2004

(30) Foreign Application Priority Data

Dec. 19, 2002  (JP) ........................................ 2002-368285

(51) Int. Cl.⁷ .............................. H02K 9/06; F01D 1/36
(52) U.S. Cl. ........................ 310/58; 310/60 R; 310/62; 310/63; 415/90
(58) Field of Search ............................ 310/58, 62, 63, 310/263, 59, 60 R, 61, 60 A; 415/90, 218.1, 121.2, 149.1, 155, 160; 416/198 R

(56) References Cited

U.S. PATENT DOCUMENTS

| | | | | |
|---|---|---|---|---|
| 4,418,295 A | * | 11/1983 | Shiga | 310/59 |
| 4,565,936 A | * | 1/1986 | Ikegami et al. | 310/62 |
| 5,021,696 A | * | 6/1991 | Nelson | 310/62 |
| 5,192,183 A | * | 3/1993 | Wilkinson | 415/90 |
| 5,254,896 A | * | 10/1993 | Bradfield et al. | 310/263 |
| 5,419,679 A | * | 5/1995 | Gaunt et al. | 415/90 |
| 5,763,968 A | | 6/1998 | Hayashi et al. | 310/263 |

* cited by examiner

Primary Examiner—Tran Nguyen
(74) Attorney, Agent, or Firm—Oliff & Berridge, PLC

(57) ABSTRACT

In a vehicle alternator having a stator, a rotor, and frames, a disc group is fixed to an axial end surface of a magnetic pole core of the rotor for creating the flow of cooling air. The disc group includes a plurality of discs layered with gaps between them. The disc group is disposed rotatable with the rotor. When the disc group rotates with the rotor, cooling air flows in a radially outward direction along the disc surfaces.

7 Claims, 3 Drawing Sheets

ROTARY ELECTRIC MACHINE

CROSS-REFERENCE TO RELATED APPLICATION

This application is based on Japanese Patent Application No. 2002-368285 filed on Dec. 19, 2002, the disclosure of which is incorporated herein by reference.

FIELD OF THE INVENTION

The present invention relates to a rotary electric machine for vehicles.

BACKGROUND OF THE INVENTION

In recent years, various rotary electric machines have needed to reduce noise. In vehicles, particularly, an engine noise has been reduced. With regard to a vehicle alternator, however, blades of a cooling fan, which rotate at relatively high speed, cause unpleasant sound by colliding with air.

To reduce such fan noise caused by the vehicle alternator, JP-A-9-289756 (U.S. Pat. No. 5,763,968) proposes the combination of diagonal flow-type blades and centrifugal flow-type blades of a cooling fan. The numbers of the diagonal flow-type blades and the centrifugal flow-type blades are determined such that one of the numbers of the diagonal flow-type blades and the centrifugal flow-type blades is not divisible by the other and both of the numbers have no common divisor other than one. By using this cooling fan, noise with predetermined order of interference is suppressed.

However, for maintaining some volume of cooling air, the level of component of each order increases. Therefore, it is difficult to reduce total noise resulting from the creation of the cooling air.

As another measure to reduce the fan noise, it is conceived to reduce the diameter of the fan. In this case, however, the volume of the cooling air is reduced. Therefore, it is difficult to employ such fan to the vehicle alternator, which needs high power output.

SUMMARY OF THE INVENTION

The present invention is made in view of the above matters, and it is an object of the present invention to provide a rotary electric machine capable of reducing total noise resulting from the creation of cooling air.

According to the present invention, a rotary electric machine includes a rotor, a stator, and a disc group. The rotor includes a rotation shaft and a field core fixed to the rotation shaft. The stator is located on an outer periphery of the field core. The disc group is disposed to be rotatable with the rotor. The disc group includes a plurality of discs. The discs are layered with gaps between them.

When the disc without having blades rotates, air flows from an inside diameter to an outside diameter of the disc along the disc surface. Therefore, the flow of cooling air in a radially outward direction is created by rotating the discs with the rotation of the rotor. Because the disc do not have blades, noise caused by interference of the cooling air and blades is suppressed. Accordingly, noises resulting from the creation of the cooling air is greatly reduced.

BRIEF DESCRIPTION OF THE DRAWINGS

Other objects, features and advantages of the present invention will become more apparent from the following detailed description made with reference to the accompanying drawings, in which.

DETAILED DESCRIPTION OF EMBODIMENT

An embodiment of the present invention will be described hereinafter with reference to the drawings.

Figure 1:
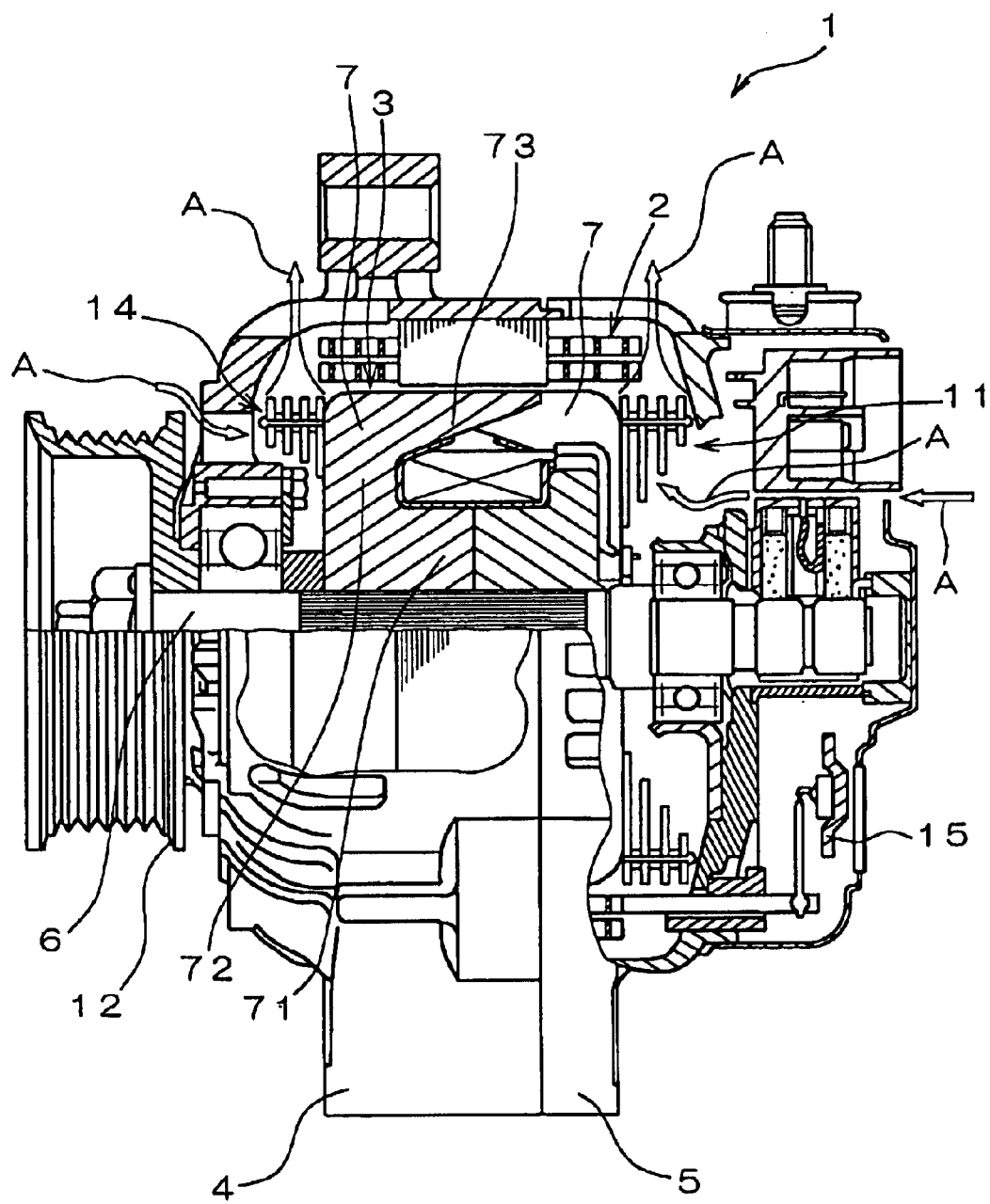
FIG. 1 is a cross-sectional view of a vehicle alternator, including a partial cross-section, according to the embodiment of the present invention.

Referring to FIG. 1, a vehicle alternator 1 of the embodiment includes a stator 2 functioning as an armature, a rotor 3 functioning as a field magnet, frames 4, 5, which support the stator 2 and the rotor 3, a rectifier 15, and the like. The rectifier 15 is directly connected to the stator 2 and rectifies alternating current outputted from the stator 2 to a direct current. An output terminal of the rectifier 15 is connected to a battery.

The rotor 3 has a rotation shaft 6 and a Lundell-type magnetic pole core 7. The rotation shaft 6 connects to a pulley 12 so that the rotor 3 is driven by a vehicle engine (not shown). The core 7 includes a boss portion 71 fitted on the rotation shaft 6, disc portions radially extending from axial ends of the boss portion 71, and claw poles 73. Further, disc groups 11 and 14 are fixed to axial end surfaces of the core 7 so that the disc groups 11, 14 rotate with the rotor 3 for creating flows of cooling air.

Figure 2:
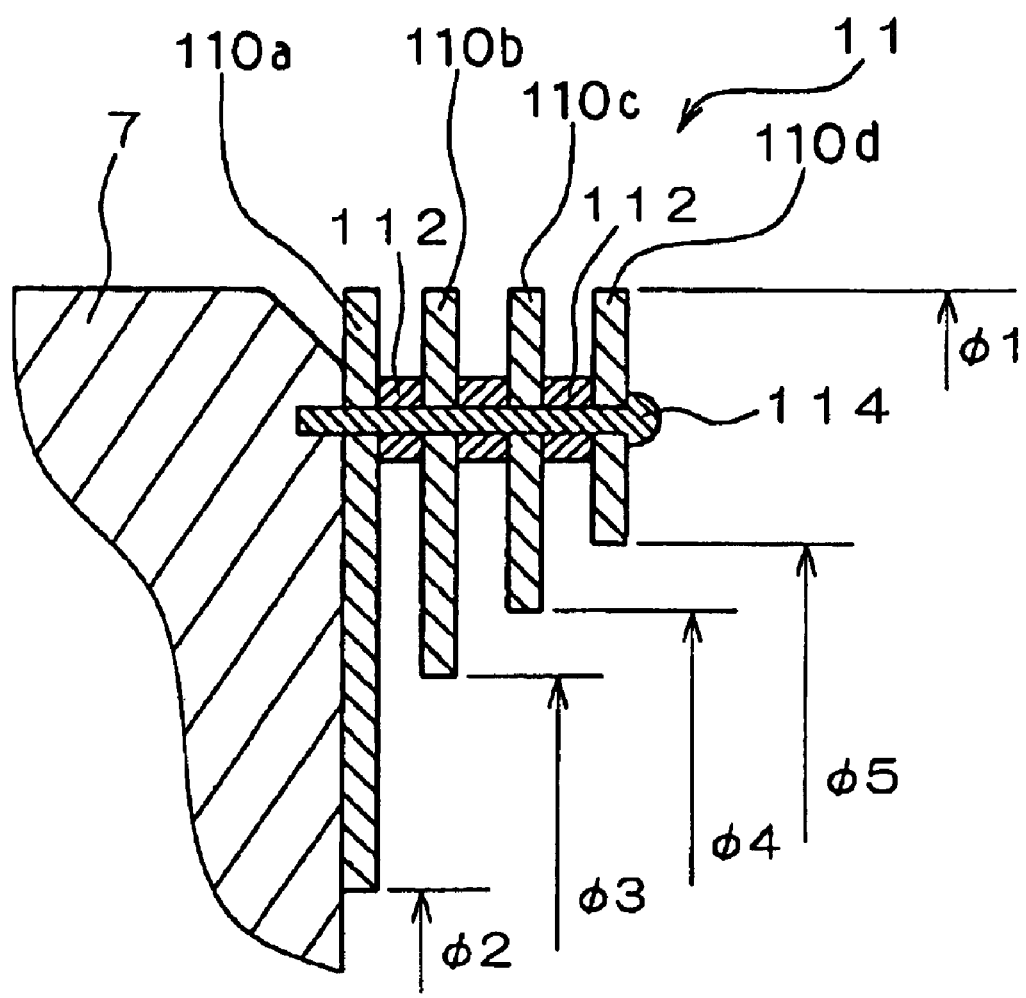
FIG. 2 is a cross-sectional view of a disc group fixed to an end of a magnetic pole core according to the embodiment of the present invention.
Figure 3:
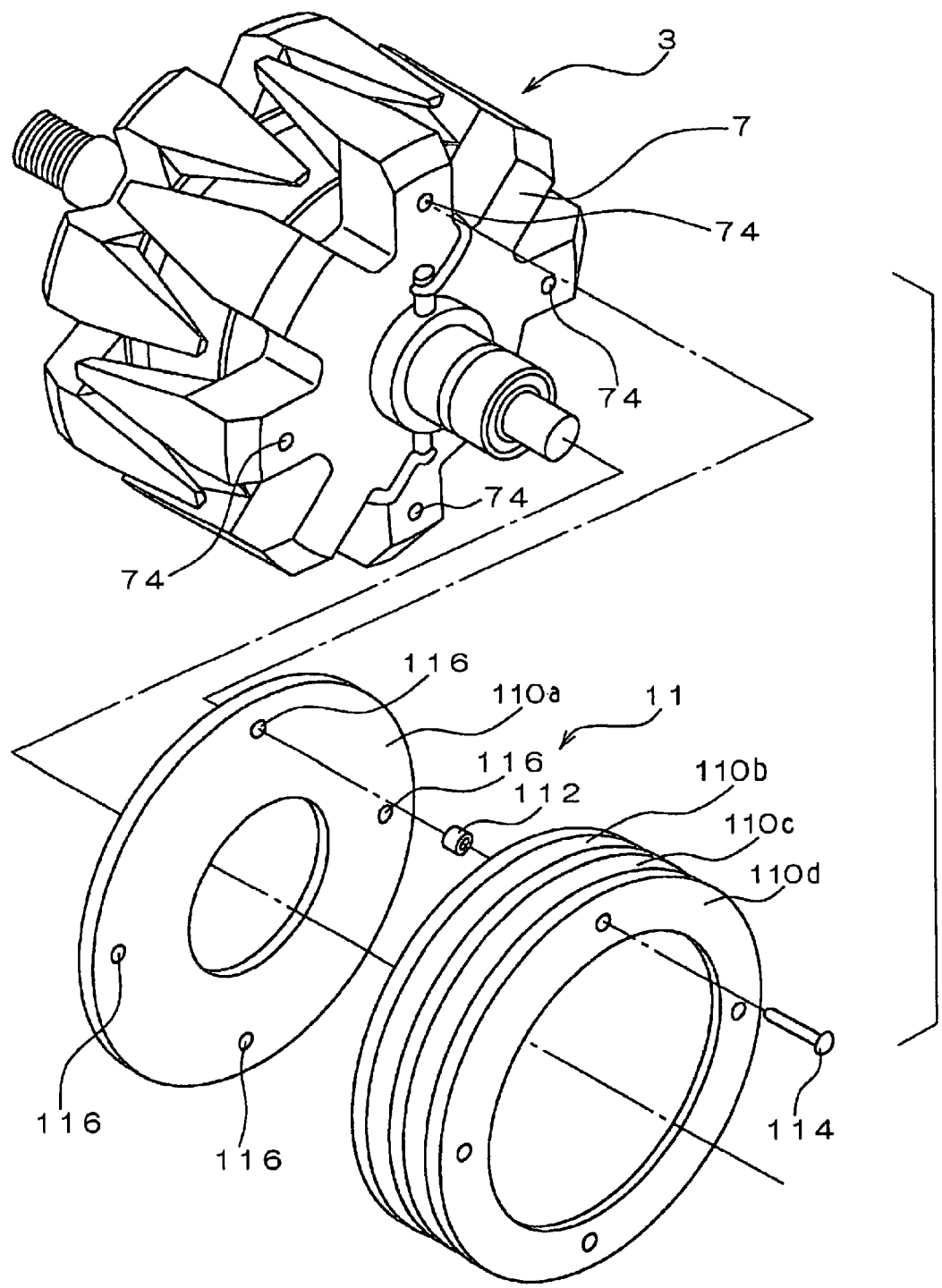
FIG. 3 is an exploded view of the disc group and a rotor according to the embodiment of the present invention.

FIG. 2 shows a cross-section of the disc group 11, which is fixed to an axial rear end surface (right side in FIG. 1) of the core 7. FIG. 3 shows an exploded view of the rear disc group 11. The discs 14 are fixed to an axial front end surface of the core 7 in a manner similar to the rear disc group 11. Hereafter, the description will be made with an example of the rear disc group 11.

Specifically, the rear disc group 11 is constructed of four discs (ring plates) 110a, 110b, 110c, 110d, spacers 112 arranged between the discs 110a to 110d, and fixing pins 114 used for fixing the discs 110a to 110d. The spacers 112 and the fixing pins 114 provide fixing members. In FIG. 3, one fixing pin 114 and one spacer 112, which is arranged between the first disc 110a and the second disc 110b are exemplary illustrated. The remaining fixing pins 114 and spacers 112 are not illustrated.

The first to fourth discs 110a to 110d are layered with gaps between them, and the first disc 110a is disposed such that the first disc 110a directly contacts the axial rear end surface of the core 7. The four fixing holes 116 for allowing the fixing pins 116 to pass through are formed on the first disc 110a at equal intervals in a circumferential direction. The second disc 10b is layered on the first disc 110a in a condition that the spacers 112 are interposed between the first disc 110a and the second disc 10b. Four fixing holes 116 are formed on the second disc 110b at positions corresponding to the fixing holes 116 of the first disc 110a. Similarly, the third disc 110c is layered on the second disc 10b in a condition that the spacers 112 are interposed between the second disc 110b and the third disc 110c. Four fixing holes 116 are formed on the third disc 110c in the similar manner. The fourth disc 10d is layered on the third disc 110c in a condition that the spacers 112 are interposed between the third disc 110c and the fourth disc 110d. Four fixing holes 116 are formed on the fourth disc 110d in the similar manner.

Further, four fixing holes 74 are formed on the axial end surface of the core 7 at positions corresponding to the fixing holes 116 of the discs 110a to 110d. The ends of the fixing pins 114 are fixed in the fixing hole 74 of the core 7 such as by screwing or press-fitting. Alternatively, the fixing pins 114 can be fixed by using an adhesive agent or by another method.

In this way, the four discs 110a to 110d are fixed on the axial rear end surface of the core 7 in a condition spaced from one another at predetermined intervals. The intervals are determined by the dimensions of the spacers 112.

Further, as shown in FIG. 2, the discs 110a to 110d have the same outside diameter φ1 in this embodiment. Regarding the inside diameter of each of the discs 110a to 110d, the first disc 110a has the smallest inside diameter φ2. The inside diameter φ3, φ4, φ5 of each of the second, third and fourth discs 110b, 110c, 110d gradually increases with a distance from the axial end of the core 7. Therefore, the disc group 11 defines a space into which air is introduced at a position proximate to a rotation axis of the disc group 11. By the this configuration of the inside diameters, resistance of air flowing in the inside diameter of the discs 110a to 110d is reduced. Although the discs 110a to 110d have the same outside diameter φ1, the outside diameters of the discs 110a to 110d can be differentiated or changed to restrict interference with the stator 2 located radially outside of the discs 110a to 110d.

In the embodiment, exemplary, each of the discs 110a to 110d has a thickness approximately 0.5 mm. The interval between two discs is approximately 2.0 mm. The disc is made of a metal plate such as an iron plate or aluminum plate in view of heat resistance and strength. Further, the disc has a smooth surface. Instead of the metal plate, the discs 110a to 110d can be made of a resin material or another material such as paper processed by using powder or liquid according to a use environment.

In general, when a disc without having blades rotates, air on the surface of the disc moves from the inside diameter to the outside diameter of the disc along the disc surface. Therefore, when the discs 110a to 110d rotate with the rotor 3, the cooling air introduced along the rotation shaft 6 is discharged in the radially outward direction along the discs 110a to 110d, as shown by arrows A in FIG. 1.

In the embodiment, the cooling air does not collide with blades, which are provided in a conventional cooling fan. Therefore, noise due to the collision with the blades is suppressed. Accordingly, total noise produced during the creation of the cooling air can be greatly reduced.

The disc groups 11, 14 are fixed by the fixing pins 114 in the condition that the spacers 112 are interposed between the respective discs 110a to 110d. Therefore, the disc groups 11, 14 are rotated while maintaining the predetermined gaps between the discs. Accordingly, the volume of cooling air produced by the disc groups 11, 14 can be maintained.

Since the disc groups 11, 14 are fixed to the axial end surfaces of the core 7, the fixing workability of the disc groups 11, 14 improves. Further, the stator 2 arranged on the radial outside of the rotor 3 can be sufficiently cooled.

Since the inside diameter of each disc 110a to 110d gradually increases toward an upstream position with respect to the flow of the cooling air that is introduced in a longitudinal direction of the rotation shaft 6. Therefore, in introducing air toward the space defined in the inner periphery of the disc groups 11, 14, the inflow resistance of the air is reduced. Accordingly, the cooling air can be effectively discharged in the radially outward direction along each disc surface.

The present invention should not be limited to the disclosed embodiment, but may be implemented in other ways without departing from the spirit of the invention.

For example, one of the front disc group 14 and the rear disc group 11 can be eliminated in the case that a sufficient volume of the cooling air can be provided by the single disc group.

In the above embodiment, the disc groups 11, 14 are directly fixed to the axial end surfaces of the core 7. Alternatively, the disc groups 11, 14 can be fixed such that the first disc 110a is spaced from the core 7. Further, the disc groups 11, 14 can be fixed to the rotation shaft 6 outside the frames 4, 5. Also, the number of discs of each disc group and the intervals between the discs are not limited to the above embodiment.

Further, in the embodiment, the present invention is employed to the vehicle alternator. However, the present invention can be employed to a rotary electric machine of a generator for purposes other than the vehicle. Further, the present invention can be employed to a rotary electric machine for any other purposes.

What is claimed is:

1. A rotary electric machine, comprising:
   a rotor including a rotation shaft and a field core fixed to the rotation shaft;
   a stator disposed on an outer periphery of the field core; and
   an annular disc group comprised of a plurality of annular discs, wherein:
   the annular disc group is secured to an axial end surface of the field core to rotate integrally with the rotor,
   a predetermined gap is disposed between each of the plurality of annular discs, each of the annular discs has an open portion and an inner diameter and an outer diameter, and
   the inner diameter of each of the annular discs increases in a direction away from the field core to thereby reduce air flow resistance.

2. The rotary electric machine of claim 1, wherein the outer diameter of each of the annular discs is substantially equal.

3. The rotary electric machine of claim 1, wherein spacers are disposed between the plurality of annular discs for maintaining a volume of cooling air produced by the annular disc group.

4. The rotary electric machine of claim 1, further comprising an electric device in a rear portion.

5. A rotary electric machine, comprising:
   a rotor including a rotation shaft and a field core fixed to the rotation shaft;
   a stator disposed on an outer periphery of the field core; and
   an annular disc group comprised of a plurality of annular discs, wherein:
   the annular disc group is secured to an axial end surface of the field core to rotate integrally with the rotor,
   a predetermined gap is disposed between each of the plurality of annular discs, each of the annular discs has an open portion and an inner diameter and an outer diameter, and
   the inner diameter of each of the annular discs decreases in a flow direction of air that is introduced along a longitudinal axis of the rotation shaft to thereby reduce air flow resistance.

6. The rotary electric machine of claim 5, wherein the outer diameter of each of the annular discs is substantially equal.

7. The rotary electric machine of claim 5, wherein each of the annular discs does not include blades to thereby reduce noise.

* * * * *